(12) United States Patent
Omran et al.

(10) Patent No.: US 10,513,181 B2
(45) Date of Patent: Dec. 24, 2019

(54) SPEED CONTROL SYSTEM FOR AN AGRICULTURAL VEHICLE

(71) Applicant: CNH Industrial America LLC, New Holland, PA (US)

(72) Inventors: Ashraf Omran, Clarendon Hills, IL (US); Brian Allen Hartman, Valparaiso, IN (US); Alberto Berselli, Modena (IT); Romolo Ciardullo, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/286,124

(22) Filed: Oct. 5, 2016

(65) Prior Publication Data

US 2017/0101010 A1    Apr. 13, 2017

Related U.S. Application Data

(60) Provisional application No. 62/238,595, filed on Oct. 7, 2015.

(51) Int. Cl.
*B60K 31/00* (2006.01)
*B60W 10/06* (2006.01)
(Continued)

(52) U.S. Cl.
CPC .............. *B60K 31/00* (2013.01); *A01F 15/08* (2013.01); *B60W 10/06* (2013.01); *B60W 10/11* (2013.01); *B60W 30/143* (2013.01); *A01F 15/071* (2013.01); *A01F 15/0883* (2013.01); *A01F 15/18* (2013.01); *B60K 2702/04* (2013.01);
(Continued)

(58) Field of Classification Search
None
See application file for complete search history.

(56) References Cited

U.S. PATENT DOCUMENTS

| 4,663,713 A | 5/1987 | Cornell et al. |
| 4,740,898 A | 4/1988 | McKee et al. |
| | (Continued) | |

FOREIGN PATENT DOCUMENTS

EP    1332911    8/2003

OTHER PUBLICATIONS

Zhang et al., "Agricultural Automation: Fundamentals and Practices", 2013, CRC Press, p. 5-9 (Year: 2013).*

*Primary Examiner* — Tamara L Weber
(74) *Attorney, Agent, or Firm* — Rickard K. DeMille; Rebecca L. Henkel

(57) ABSTRACT

A speed control system for an agricultural system having an agricultural vehicle includes a control system. The control system instructs an engine to maintain a constant speed, determines a first estimated speed of the agricultural vehicle associated with increasing a gear index of a step ratio transmission, determines a second estimated speed of the agricultural vehicle associated with decreasing the gear index of the step ratio transmission, instructs the step ratio transmission to increase the gear index if the first estimated speed is closer to a target speed than the second estimated speed and a current speed of the agricultural vehicle, and instructs the step ratio transmission to decrease the gear index if the second estimated speed is closer to the target speed than the first estimated speed and the current speed.

10 Claims, 4 Drawing Sheets

(51) Int. Cl.
  *B60W 10/11* (2012.01)
  *A01F 15/08* (2006.01)
  *B60W 30/14* (2006.01)
  *A01F 15/07* (2006.01)
  *A01F 15/18* (2006.01)

(52) U.S. Cl.
  CPC ..... *B60W 2300/15* (2013.01); *B60W 2510/06* (2013.01); *B60W 2510/1005* (2013.01); *B60W 2520/10* (2013.01); *B60W 2710/1005* (2013.01); *B60W 2720/10* (2013.01)

(56) References Cited

U.S. PATENT DOCUMENTS

| | | | |
|---|---|---|---|
| 5,406,483 A | 4/1995 | Kallis et al. | |
| 5,611,245 A | 3/1997 | McKee | |
| 5,778,329 A * | 7/1998 | Officer | F16H 59/14 123/564 |
| 6,066,070 A | 5/2000 | Ito et al. | |
| 6,151,543 A | 11/2000 | McKee et al. | |
| 7,451,029 B2 | 11/2008 | Mclaren et al. | |
| 8,065,062 B2 | 11/2011 | Prebeck et al. | |
| 8,145,398 B2 | 3/2012 | Landes et al. | |
| 8,527,156 B2 * | 9/2013 | Martin | A01B 69/008 414/111 |
| 8,738,250 B2 | 5/2014 | Hoff | |
| 8,801,572 B2 | 8/2014 | Ringwald et al. | |
| 8,954,246 B2 | 2/2015 | Siegel et al. | |
| 8,972,123 B2 | 3/2015 | Smith et al. | |
| 2006/0167610 A1 | 7/2006 | Reinards et al. | |
| 2013/0110361 A1 * | 5/2013 | Steeby | B60W 10/06 701/54 |
| 2013/0158838 A1 | 6/2013 | Yorke et al. | |
| 2013/0166171 A1 | 6/2013 | Hartman et al. | |
| 2014/0052351 A1 | 2/2014 | Weber | |
| 2015/0032344 A1 | 1/2015 | Hou et al. | |
| 2016/0316621 A1 * | 11/2016 | Fritz | B60L 1/00 |

* cited by examiner

SPEED CONTROL SYSTEM FOR AN AGRICULTURAL VEHICLE

BACKGROUND

The subject matter disclosed herein relates generally to a speed control system for an agricultural vehicle.

A baler may be used to consolidate and package crop material into bales. In some cases, the baler may be towed by a vehicle. The baler may include a wrapping mechanism to wrap each completed bale in twine or a net to maintain the shape of the bale. Once the baler forms a completed bale, the vehicle is stopped to enable the baler to deposit the bale in the agricultural field for later collection. Once the bale is deposited, the vehicle is returned to an operating speed. However, when the vehicle is operated in a constant engine speed mode, attempting to return the vehicle to a desired speed after stopping (e.g., by upshifting through gears of a step ratio transmission) may cause the vehicle and the baler to travel at a speed slightly faster or slightly slower than a desired speed. Over time, the aggregate of the small speed differences may cause the vehicle and the baler to travel at an undesirable speed (e.g., slower than the desired speed), thereby reducing efficiency of baling operations.

BRIEF DESCRIPTION

In one embodiment, a speed control system for an agricultural system having an agricultural vehicle includes a control system comprising an agricultural vehicle control system and an implement control system, where at least during steady-state operation of the agricultural vehicle. The control system is configured to instruct an engine to maintain a constant speed, determine a first estimated speed of the agricultural vehicle associated with increasing a gear index of a step ratio transmission, determine a second estimated speed of the agricultural vehicle associated with decreasing the gear index of the step ratio transmission, instruct the step ratio transmission to increase the gear index if the first estimated speed is closer to a target speed than the second estimated speed and a current speed of the agricultural vehicle, and instruct the step ratio transmission to decrease the gear index if the second estimated speed is closer to the target speed than the first estimated speed and the current speed.

In another embodiment, an apparatus includes at least one non-transitory, tangible, machine-readable media having instructions encoded thereon for execution by a processor at least during steady state operations of an agricultural vehicle. The instructions comprising instructions to instruct an engine to maintain a constant speed, instructions to determine a first estimated speed of the agricultural vehicle associated with increasing a gear index of a step ratio transmission, instructions to determine a second estimated speed of the agricultural vehicle associated with decreasing the gear index of the step ratio transmission, instructions to instruct the step ratio transmission to increase the gear index if the first estimated speed is closer to a target speed than the second estimated speed and a current speed of the agricultural vehicle, and instructions to instruct the step ratio transmission to decrease the gear index if the second estimated speed is closer to the target speed than the first estimated speed and the current speed.

In a further embodiment, a method includes monitoring and controlling an agricultural system via an agricultural vehicle control system comprising instructing an engine to maintain a constant speed, determining a first estimated speed of the agricultural vehicle associated with increasing a gear index of a step ratio transmission, determining a second estimated speed of the agricultural vehicle associated with decreasing the gear index of the step ratio transmission, instructing the step ratio transmission to increase the gear index if the first estimated speed is closer to a target speed than the second estimated speed and a current speed of the agricultural vehicle, and instructing the step ratio transmission to decrease the gear index if the second estimated speed is closer to the target speed than the first estimated speed and the current speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
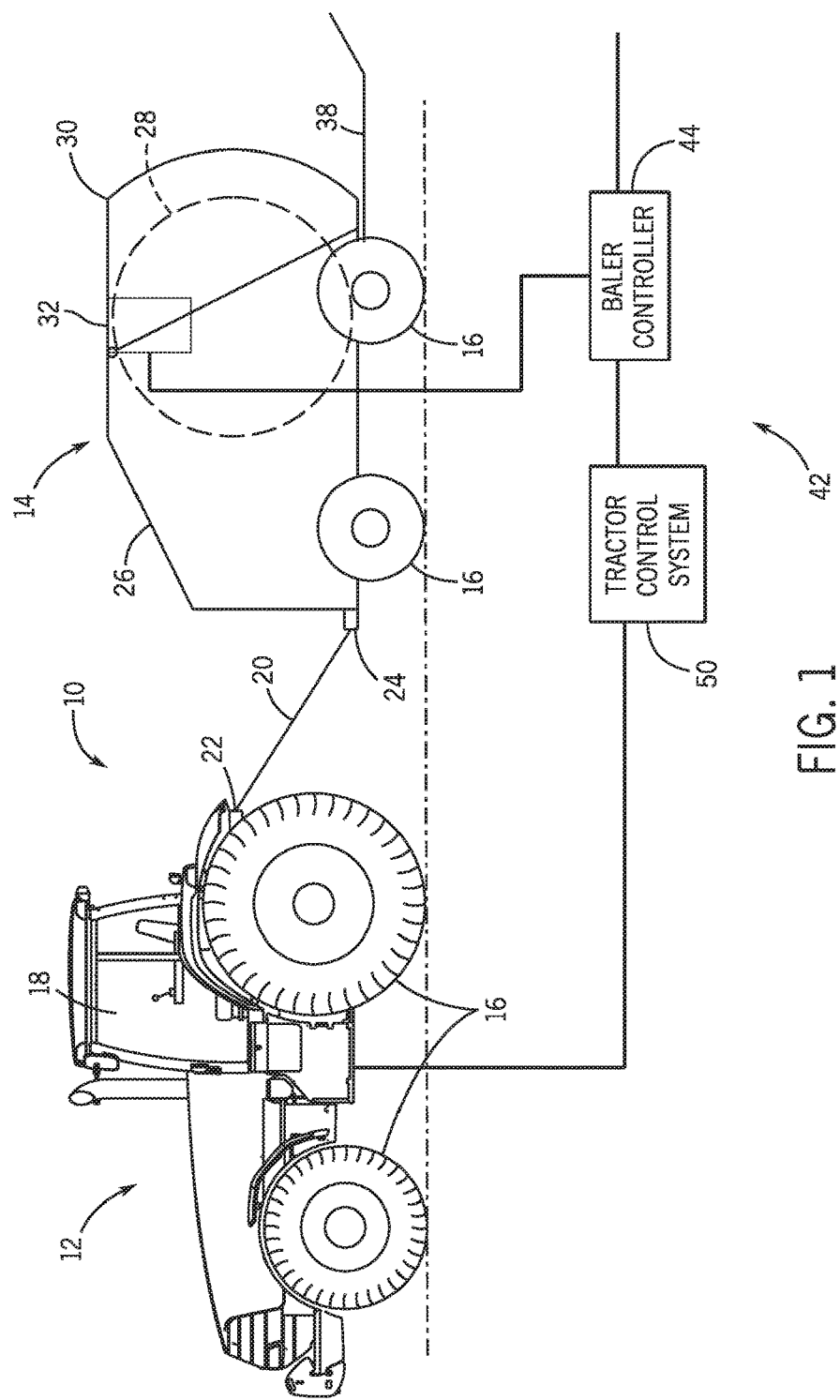
FIG. 1 is a schematic side view of an embodiment of a bale collection system.

Certain embodiments disclosed herein include a speed control system for an agricultural vehicle including a control system configured to enable the agricultural vehicle to operate closer to a target speed (e.g., constant target engine speed) by estimating speeds associated with increasing and decreasing a gear index, and increasing or decreasing the gear index if the respective estimated speed is closer to the target speed than the current speed. For example, an operator may manually drive the vehicle at a target speed to plow a field, till land, plant seed, bale agricultural product, or accomplish other agricultural operations. The vehicle may be operated at constant engine speed (e.g., during steady-state operations). In certain embodiments, operating the vehicle proceeds through a field along with a baler while remaining communicatively coupled to the baler (e.g., a baler controller is communicatively coupled to a tractor controller). In certain embodiments, a communication protocol (e.g., ISOBUS Class 3) is configured to enable an implement (e.g., baler) pulled behind the vehicle (e.g., tractor) to control the vehicle by instructing the vehicle to stop and start. When the baler is full or is commanded to stop to eject the contents (e.g., bale) of the baler, the baler instructs the vehicle to stop, and the vehicle speed is reduced until the vehicle stops. The baler controller commands the baler to eject the contents of the baler. At or around the time the bale is ejected, the baler, via the communication protocol (e.g., ISOBUS Class 3), instructs the tractor to return to the previous speed (e.g., the speed before the stop). While operating in a constant engine speed mode, returning to the previous speed involves upshifting the tractor transmission until the previous speed is substantially reached.

When the previous speed is reached, the control system executes an estimator of a control system. The estimator determines whether changing gears would result in a smaller difference between the target speed and the current speed of the tractor. For example, the estimator may determine an estimated speed associated with upshifting one or more gears, downshifting one or more gears, or remaining in the same gear. Accordingly, the estimator determines whether upshifting, downshifting, or remaining in the same gear results in the smallest difference between the target speed and the current speed. If changing gears would result in a smaller speed difference than a previously selected gear, the control system instructs the transmission to change to the new gear, thereby resulting in the smaller speed difference. Once at the new gear, the estimator again determines whether upshifting, downshifting, or remaining in the same gear would result in a smaller speed difference between the target speed and the current speed. If changing gears would result in a smaller speed difference than the previously selected gear, the control system again instructs the transmission to change gears. The control system may perform numerous iterations until the gear selected results in the smallest difference between the current speed and the target speed of the vehicle.

FIG. 1 is a schematic side view of an embodiment of a bale collection system 10. In the illustrated embodiment, the system 10 includes an agricultural vehicle, such as the illustrated tractor 12, and a round baler 14. The tractor 12 has wheels 16 that enable the tractor 12 to move across an agricultural field and to drive movement of the baler 14. Moreover, the tractor 12 has a cab 18 for an operator to control the bale collection process. For example, the operator may be able to start and stop operation of the baler 14 from the cab 18.

The tractor 12 couples to the baler 14 using a tongue 20 mounted on a hitch 22. Coupling the tractor 12 and baler 14 together enables the tractor 12 to guide the baler 14 around the agricultural field. As such, the tractor 12 guides the baler 14 toward crop material deposited in windrows on the agricultural field. To collect the crop material, the baler 14 includes a crop collector 24 mounted on the front end of the baler 14. The crop collector 24 may have a rotating wheel that collects the crop material from the ground and directs the crop material toward a bale chamber 26. Inside the bale chamber 26, rollers, belts, and/or other devices compact the crop material to form a generally cylindrically shaped bale 28. The bale 28 is contained within the baler 14 until ejection of the bale 28 is instructed (e.g., by the operator or an automated system). In certain embodiments, the bale 28 may be automatically ejected from the baler 14 once the bale 28 is formed.

As mentioned above, the bale 28 is contained within the baler 14 until ejected by the operator or automated system. In the illustrated embodiment, the tailgate 30 is rotatably coupled to the bale chamber 26. Rotation of the tailgate 30 is controlled by an actuator assembly 32. In some embodiments, the actuator assembly 32 includes a hydraulic system, a pulley system, electric motor, or the like to rotate the tailgate 30. The bale 28 may be ejected once the tailgate 30 is in the open position. In the illustrated embodiment, the baler 14 has a ramp 38 configured to receive and to direct the bale 28 away from the baler 14 once the bale 28 is ejected from the bale chamber 26.

After the bale 28 is ejected, the operator or automated system may command the tractor 12 and the baler 14 to return to the previous speed so the tractor 12 and the baler 14 can resume agricultural operations. A control system 42 includes a baler control system 44 and a tractor control system 50 (e.g., Automotive Productivity Manager (APM)). In certain embodiments, the tractor control system 50 is mounted on the tractor 12, and the baler is control system 44 is mounted on the baler 14. In certain embodiments after stopping to eject a bale, the tractor 12 is instructed to return to the previous speed via the control system 42. In certain embodiments, the control system 42 (e.g., the tractor control system 50) includes an estimator configured to compare an estimated speed associated with a subsequent gear (e.g., higher gear index) and an estimated speed associated with a preceding gear to determine whether one of the estimated speeds is closer to the target speed than the current speed. The control system 42 selects the gear to reduce the speed difference. By way of example, once the baler 14 has ejected the bale 28, the tractor 12 and the baler 14 may return to performing agricultural tasks in the field. As such, the tractor 12 is instructed to return to the previous speed to resume performing these agricultural tasks. To reduce the difference between the current speed of the tractor 12 and the target speed of the tractor 12 after resuming movement of the tractor 12, the estimator determines which gear of a set of gears of the tractor transmission results in the smallest difference between the target speed and the current speed. The control system then instructs the tractor transmission to upshift (e.g., increase the gear index), downshift (e.g., decrease the gear index), or remain in the same gear, as described further with respect to FIGS. 2-6.

Figure 2:
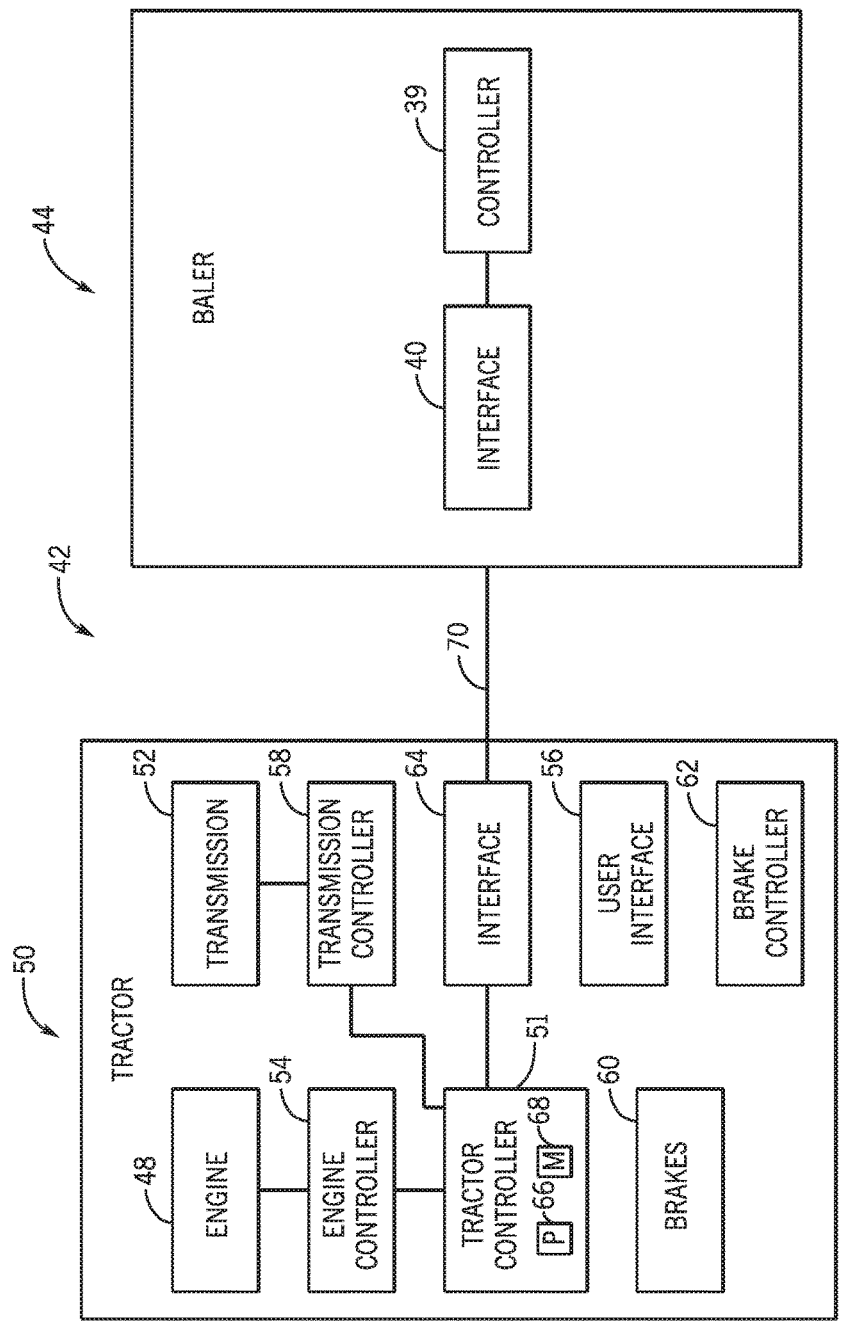
FIG. 2 is a block diagram of an embodiment of a control system that may be utilized to control the bale collection system of FIG. 1.

FIG. 2 is a block diagram of an embodiment of a control system 42 that may be utilized to control the bale collection system of FIG. 1. As described above, the control system 42 includes a baler control system 44 and a tractor control system 50 (e.g., Automotive Productivity Manager (APM)). The tractor control system 50 includes an engine controller 54, a tractor controller 51, transmission controller 58, and a brake controller 62. The engine controller 54 is configured to control an engine 48, and the transmission controller 58 is configured to control a transmission 52. In certain embodiments, the transmission 52 is a step ratio transmission that includes multiple discrete gears (e.g., as compared to a continuously variable transmission). Each gear of the transmission has an associated gear index and establishes a different gear ratio when selected. Increasing the gear index reduces the gear ratio, and decreasing the gear index increases the gear ratio. The brake controller 62 may control brakes 60 of the tractor 12. The tractor control system 50 includes a tractor network interface 64 and a user interface 56. The baler control system 44 includes a baler controller 39 and a baler network interface 40 to interface with the tractor network interface 64. As described in detail below, the network interfaces 64 and 40 are configured to communicated via a communication protocol 70 (e.g., ISOBUS Class 3), which enables the baler controller 39 to communicate with the tractor controller 51.

In the illustrated embodiment, the engine controller 54 may receive signals from sensors configured to output measurements (e.g., speed) of the engine 48. In certain embodiments, the engine controller 54 may control the engine 48 such that the engine maintains a constant engine speed. In the illustrated embodiment, the tractor controller 51 includes a memory 66 and a processor 68. The memory 66 may be any type of non-transitory machine readable medium for storing data and executable instructions, such as random-access memory, read-only memory, rewritable flash memory, hard drives, optical discs, and the like. The processor 68 may execute instructions stored on the memory 66. For example, the memory 66 may contain machine readable code, such as instructions, that may be executed by the processor 68. In some embodiments, the memory 66 and processor 68 may enable automatic (e.g., processor/memory controlled) shifting between gears of the transmission 52 as necessary to enhance baling operations.

In the illustrated embodiment, the tractor controller 51 and the baler controller 39 are communicatively coupled through the communication protocol 70, such as ISOBUS Class 3. The communication protocol 70 enables the baler controller 39 (e.g., implement) to provide information to the tractor controller 51. Moreover, the communication protocol 70 enables the baler controller 39 to control certain aspects of the operation of the tractor controller 51. In the illustrated embodiment, a target constant engine speed (e.g., revolutions per minute) of the tractor engine and a target speed of the tractor may be set via the user interface 56. Using the target information (e.g., target engine speed and target speed of the tractor), an estimator (e.g., executed by the tractor controller) determines a gear that would cause the tractor 12 to move at a speed closest to the target speed while the engine 48 operates at the target constant engine speed. As described further with respect to FIG. 3, the estimator may estimate the tractor speed after an upshift (e.g., gear index increase) and a downshift (e.g., gear index decrease) to determine whether changing gears would cause the tractor speed to be closer to the target speed than the current speed. At least during steady-state operation of the tractor 12, the control system 42 instructs the engine 48 of the tractor 12 to maintain a constant speed. Steady-state operation as described herein include operating the tractor 12 at an approximately constant speed (i.e., not accelerating from a stop to the previous speed, and not decelerating to a stop). Steady-state operation includes periodically shifting gears such that the current tractor speed is closest to the target speed. The control system 42 determines (e.g., via the estimator) a first estimated speed of the agricultural vehicle associated with increasing a gear index of the transmission 52 and determines (e.g., via the estimator) a second estimated speed of the agricultural vehicle associated with decreasing the gear index of the transmission 52. The control system 42 instructs the transmission 52 to increase the gear index if the first estimated speed is closer to the target speed than the second estimated speed and the current speed of the agricultural vehicle. Alternatively, the control system 42 instructs the transmission 52 to decrease the gear index if the second estimated speed is closer to the target speed than the first estimated speed and the current speed.

While the estimator is disabled, the tractor 12 returns to the previously selected gear (e.g., the gear selected before the vehicle stops to eject the bale) without considering whether a subsequent gear or a preceding gear may cause the tractor to move at a speed closer to the target speed. In the case of upshifting without the estimator, the controller (e.g., tractor controller 51) may stop at the gear index with a closest speed less than the target tractor speed. In the case of downshifting without the estimator, the controller (e.g., tractor controller 51) may stop at the gear index with a closest speed higher than the target tractor speed. As such, without use of the estimator, the speed which the tractor 12 is returned to may not be the closest speed to the target tractor speed. Enabling the estimator may facilitate improved efficiency of the baling operations by returning the tractor 12 to a speed closer to the target speed by considering whether shifting to a subsequent gear or a preceding gear causes the tractor 12 to move at a speed closer to the target speed.

Figure 4:
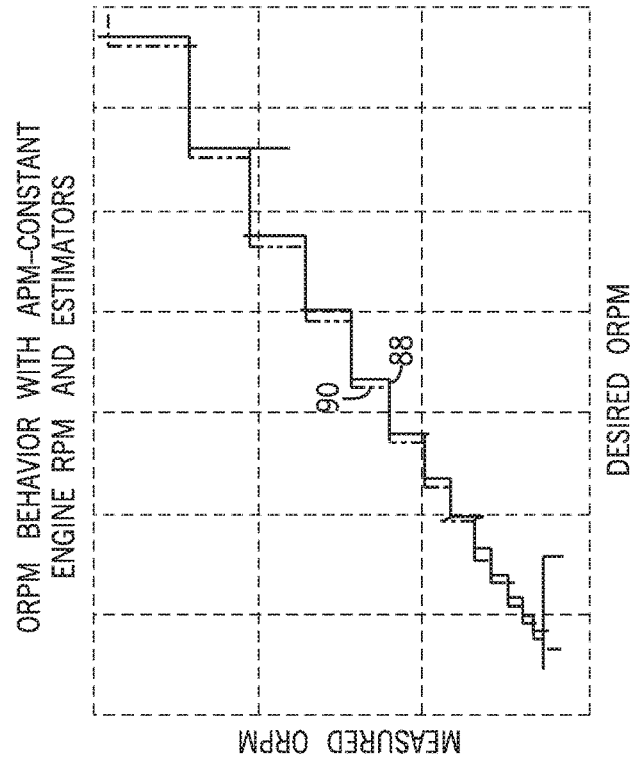
FIG. 4 is a graph of target transmission output speed versus measured transmission output speed with the gear estimator enabled.
Figure 3:
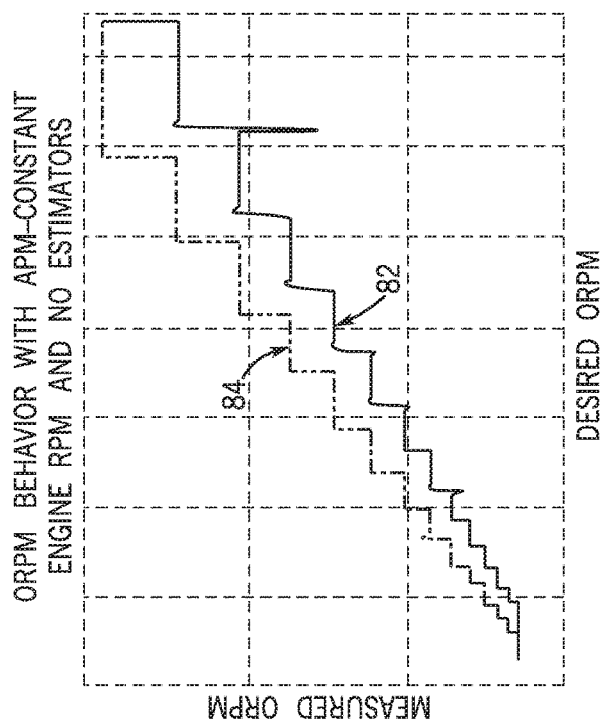
FIG. 3 is a graph of target transmission output speed versus measured transmission output speed with a gear estimator disabled.

FIGS. 3-4 illustrate comparison of the target output transmission speed versus the measured output transmission speed with estimator disabled and enabled at constant requested engine speed. FIG. 3 is a graph of the target engine speed versus the measured engine speed with a gear estimator disabled. As illustrated, upshifting gears is represented by line 82. In the case of upshifting without the estimator, the controller (e.g., tractor controller 51) may stop at the gear index with a closest speed less than the target tractor speed. Downshifting gears is represented by line 84. In the case of downshifting without the estimator, the controller (e.g., tractor controller 51) may stop at the gear index with a closest speed higher than the target tractor speed. Without use of the estimator, the difference in the measured revolutions per minute for the upshifting the gears and downshifting gears the gears is large when compared to using the estimator (see FIG. 4). In one non-limiting example, if the desired output revolutions per minute (RPM) is 1000 RPM, the upshift of gears may result in a measured RPM of 863 RPM. The downshift of gears may result in a measured RPM of 1037 RPM. The difference between upshifting gears and downshifting gears is approximately 174 RPM.

FIG. 4 is a graph of the target output transmission speed versus the measured output transmission speed with a gear estimator enabled. In the illustrated embodiment with the use of the estimator, upshifting and downshifting help identify a gear range for the tractor 12 that achieves the target speed of the tractor 12. In the illustrated embodiment with the use of the estimator, upshifting gears is represented by line 88. Downshifting gears is represented by line 90. With use of the estimator, the difference in the measured revolutions per minute for the upshifting the gears and downshifting gears the gears is small (near zero). In one non limiting example, if the desired output revolutions per minute (RPM) is 1000 RPM, the upshift of gears may result in a measured RPM of 1030 RPM. The downshift of gears may result in a measured RPM of 1030 RPM. The difference between upshifting gears and downshifting gears (e.g., error 92) is approximately 0 RPM, resulting in the estimator being able to select the gear to get closest to the target speed of the tractor 12. As such, use of the estimator enables the speed which the tractor 12 is returned to be the closest speed to the target tractor speed.

Figure 5:
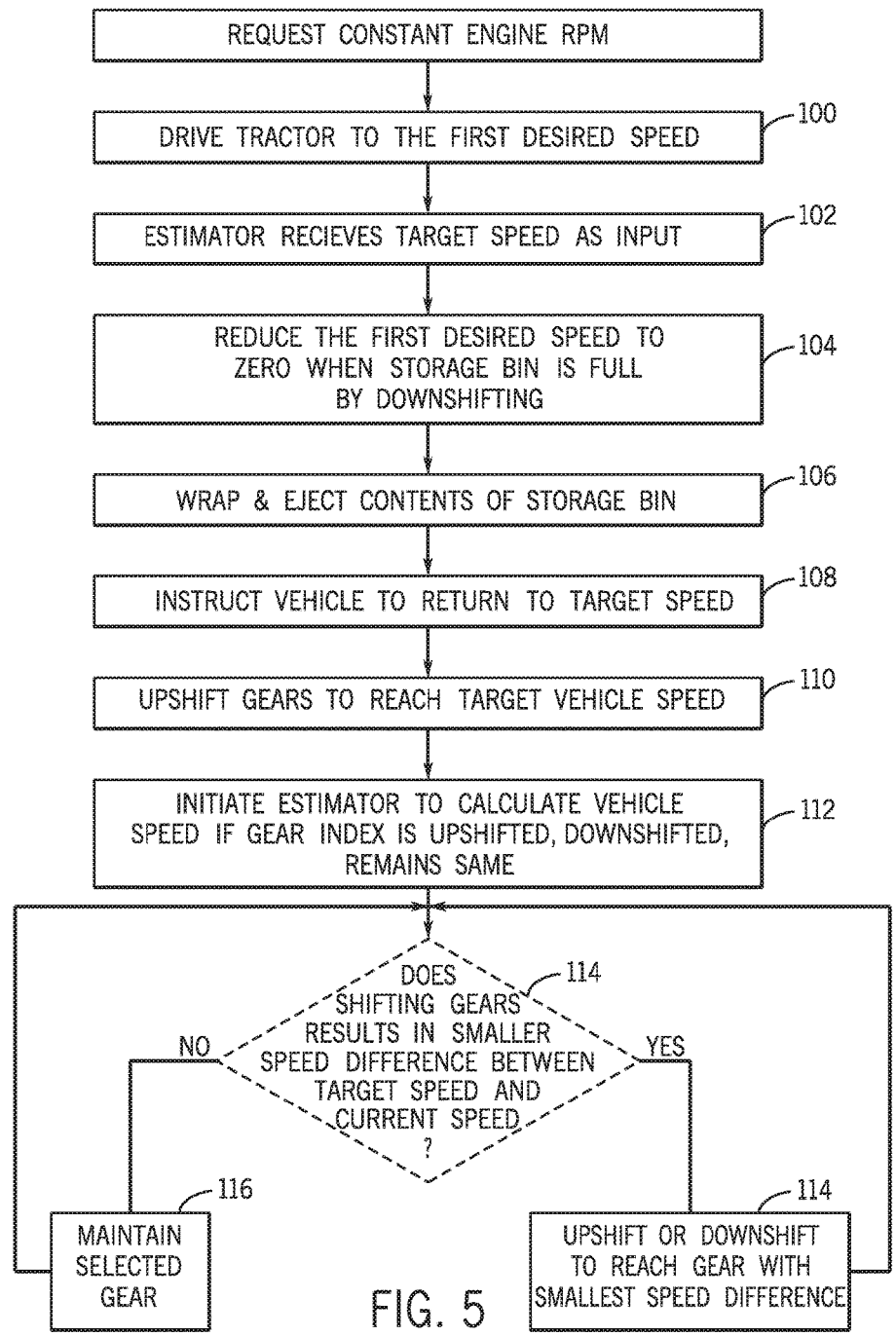
FIG. 5 is a flow diagram of an embodiment of a method for controlling the speed of an agricultural vehicle.

FIG. 5 is a flow diagram of an embodiment of a method for controlling the speed of an agricultural vehicle. An operator manually drives the tractor to a target speed to bale agricultural product, plow a field, till land, plant seed, or accomplish other agricultural operations (block 100). When the tractor operating at an approximately constant speed, the tractor is engaged in steady-state operation. As described above, the estimator receives a target speed as an input (block 102). In the illustrated embodiment, the tractor proceeds through the field along with the baler. When the baler is full or is commanded to stop to eject the contents of the baler, the tractor and the baler speed are reduced (block 104) by the control system downshifting through the gears to reach a stop. The baler controller commands the baler to eject the contents of the baler (block 106). When the operator or baler controller instruct the tractor controller to command the tractor to return to the previous speed and the previous speed is substantially reached, the baler controller communicates with the transmission controller via the communication protocol (e.g., ISOBUS Class 3) (block 108). The transmission controller may upshift through the gears until the previous speed is reached (block 110). When the previous speed is substantially reached, the estimator is executed (e.g., by the processor of the tractor controller) (block 112). The estimator then determines whether changing gears would result in a smaller speed difference between the target speed and the current speed of the tractor (block 114). For example, the estimator may determine an estimated speed associated with increasing the gear index and decreasing the gear index. Accordingly, the estimator determines whether upshifting, downshifting, or remaining in the same gear results in a smaller speed difference. For example, if changing gears results in a smaller speed difference than a previously selected gear, the control system instructs the transmission controller to change to the new gear resulting in the smaller speed difference. Once at the new gear, the estimator again determines whether upshifting, downshifting, or remaining in the same gear results in a smaller speed difference. If changing gears would result in a smaller speed difference than the previously selected gear, the estimator again instructs the transmission controller to change to the next gear, thereby resulting in the smaller speed difference between the target speed and the current speed. The estimator may perform numerous iterations until the estimator determines the gear selected results in the smallest speed difference between the current and the target speed (block 116).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A speed control system for an agricultural system having an agricultural vehicle, comprising:
   an implement control system having an implement controller; and
   a control system comprising an agricultural vehicle control system communicatively coupled to the implement control system via a communication protocol, wherein the agricultural vehicle control system comprises a user interface configured to receive a target speed of the agricultural vehicle, an agricultural vehicle controller having a memory and a processor, wherein at least during steady-state operation of the agricultural vehicle, the agricultural vehicle controller is configured to:
   cause an engine to maintain a constant speed;
   receive the target speed from the user interface;
   obtain a current speed of the agricultural vehicle;
   determine a first estimated speed of the agricultural vehicle associated with increasing a gear index of a step ratio transmission;
   determine a second estimated speed of the agricultural vehicle associated with decreasing the gear index of the step ratio transmission;
   cause the step ratio transmission to increase the gear index in response to determining that the first estimated speed is closer to the target speed than the second estimated speed and the current speed of the agricultural vehicle;
   cause the step ratio transmission to decrease the gear index in response to determining that the second estimated speed is closer to the target speed than the first estimated speed and the current speed; and
   cause the step ratio transmission to progressively increase the gear index to start the agricultural vehicle in response to the implement controller causing the agricultural vehicle controller to start the agricultural vehicle.

2. The speed control system of claim 1 wherein the communication protocol comprises an ISOBUS Class 3 protocol.

3. The speed control system of claim 1, wherein the implement controller is configured to cause the agricultural vehicle controller to stop the agricultural vehicle.

4. The speed control system of claim 1, wherein the agricultural vehicle controller is configured to cyclically determine the first estimated speed, determine the second estimated speed, increase the gear index of the step ratio transmission in response to determining that the first estimated speed is closer to the target speed than the second estimated speed and the current speed, and cause the step ratio transmission to decrease the gear index in response to determining that the second estimated speed is closer to the target speed than the first estimated speed and the current speed, at least during steady-state operation at the agricultural vehicle.

5. A speed control system for an agricultural system having an agricultural vehicle, comprising:
   an implement control system having an implement controller; and
   a control system comprising an agricultural vehicle control system communicatively coupled to the implement control system via a communication protocol, wherein the agricultural vehicle control system comprises a user interface configured to receive a target speed of the agricultural vehicle, an agricultural vehicle controller having a memory and a processor, wherein at least during steady-state operation of the agricultural vehicle, the agricultural vehicle controller is configured to:
   cause an engine to maintain a constant speed;
   receive the target speed from the user interface;
   obtain a current speed of the agricultural vehicle;
   determine a first estimated speed of the agricultural vehicle associated with increasing a gear index of a step ratio transmission;
   determine a second estimated speed of the agricultural vehicle associated with decreasing the gear index of the step ratio transmission;
   cause the step ratio transmission to increase the gear index in response to determining that the first estimated speed is closer to the target speed than the second estimated speed and the current speed of the agricultural vehicle;
   cause the step ratio transmission to decrease the gear index in response to determining that the second estimated speed is closer to the target speed than the first estimated speed and the current speed;
   cause the agricultural vehicle controller to stop the agricultural vehicle;
   cause the step ratio transmission to progressively decrease the gear index to stop the agricultural vehicle in response to the implement controller causing the agricultural vehicle controller to stop the agricultural vehicle.

6. The speed control system of claim 5, wherein the agricultural vehicle controller is configured to cause the step ratio transmission to progressively increase the gear index to start the agricultural vehicle in response to the implement controller causing the agricultural vehicle controller to start the agricultural vehicle.

7. An apparatus comprising:
at least one non-transitory, tangible, machine-readable media having instructions encoded thereon for execution by a processor of an agricultural vehicle controller of an agricultural vehicle control system at least during steady state operations of an agricultural vehicle, the instructions comprising:
   instructions to communicatively couple the agricultural vehicle control system and an implement control system having an implement controller via a communication protocol;
   instructions to cause an engine to maintain a constant speed;
   instructions to receive a target speed from a user interface;
   instructions to obtain a current speed of the agricultural vehicle;
   instructions to determine a first estimated speed of the agricultural vehicle associated with increasing a gear index of a step ratio transmission;
   instructions to determine a second estimated speed of the agricultural vehicle associated with decreasing the gear index of the step ratio transmission;
   instructions to cause the step ratio transmission to increase the gear index in response to determining that the first estimated speed is closer to a target speed than the second estimated speed and a current speed of the agricultural vehicle;
   instructions to cause the step ratio transmission to decrease the gear index in response to determining that the second estimated speed is closer to the target speed than the first estimated speed and the current speed; and
   instructions to instruct the step ratio transmission to progressively decrease the gear index to stop the agricultural vehicle in response to the implement controller causing the agricultural vehicle controller to stop the agricultural vehicle.

8. The apparatus of claim 7, wherein the communication protocol comprises an ISOBUS Class 3 protocol.

9. The apparatus of claim 7, wherein the instructions comprise instructions to stop the agricultural vehicle by downshifting through a plurality of gears.

10. The apparatus of claim 7, wherein the instructions comprise instructions to instruct the step ratio transmission to progressively increase the gear index to start the agricultural vehicle in response to the implement controller causing the agricultural vehicle controller to start the agricultural vehicle.

* * * * *